United States Patent Office 2,817,504
Patented Dec. 24, 1957

2,817,504

MINING OF SULFUR USING HOT SALINE WATER CONTAINING A SMALL PERCENTAGE OF FINELY DIVIDED EARTHY MATERIAL

Bernard A. Axelrad, Freeport, Tex., assignor to Freeport Sulphur Company, New York, N. Y., a corporation of Delaware No Drawing. Application September 30, 1953
Serial No. 383,371

8 Claims. (Cl. 262—3)

This invention relates to the mining of sulfur and especially to processes for providing water heated to the high temperatures required in such mining operations. More specifically it relates to the preparation and utilization of sea and other saline waters having scale-forming properties for said purpose.

In mining by the Frasch process, it is common practice to remove scale-forming constituents from the well water or surface water to be used by means of a lime-soda treatment or other water-softening method prior to introduction of the water into the heating system. If this softening process is not used, the calcium sulfate which has an inverse solubility curve deposits as a hard scale when the water is heated and also the calcium and magnesium bicarbonates in the water decompose at the higher temperatures employed and precipitate calcium carbonate and magnesium hydroxide and form a hard scale on the interior surfaces of the heater, the pipes and valves, thereby rapidly reducing the efficiency of the heater and actually constricting the flow to such a point that the operation becomes uneconomic.

If sea water or other saline water including formation water or bleed water produced in the sulfur mining operation, and in particular, those waters containing appreciable amounts of calcium and magnesium compounds are heated by conventional procedures in the usual equipment to the ultimate temperatures required for the mining of sulfur, the salts contained in the water would rapidly precipitate out and form a hard scale which would make such process wholly uneconomic. The equipment would have to be taken out of service often and cleaned by mechanical means such as turbining or scraping to remove the scale.

The conventional method of preparing fresh water or chemically treated water for use in the Frasch process is to heat it from its naturally occurring temperature to about 140° F. by heat exchange with boiler furnace flue gases through scrubbing of the gases in some form of packed tower; next to heat it to about 200 to 210° F. with low pressure exhaust steam introduced directly into the water, and finally to heat the water to a temperature of from about 330 to 360° F. by mixing the water with high pressure steam while maintaining the water under pressure. If sea water, brackish water or any saline water such as formation water having a high content of calcium and magnesium salts is heated by this conventional procedure, the deposition of scale is so rapid that continuation of the operation becomes impossible within a few hours due to scale deposition upon the valves, pipes and fittings.

Chemical treatment of these saline waters to remove the scale-forming constituents is uneconomic because of the large quantity of chemicals required. Yet in many locations where sulfur deposits are found, fresh water suitable for the purpose is not available, extremely large amounts of water being required.

The cost of the chemicals and equipment necessary to stabilize saline water of high scaling potentialities, by these known procedures, to withstand the elevated temperatures and pressures required for sulfur mining is high and may be prohibitive.

An object of the present invention is to provide large quantities of very hot water at low cost from water of high salt content without utilizing any filtering or other step to remove physically the scale-forming constituents from the water. Another object is to make it possible to heat such water in the conventional equipment used in the mining of sulfur by the Frasch process.

A further object of the invention is to provide a process for heating sea water to sulfur mining temperatures in heating tubes in which the scale-forming constituents do not deposit on the heating surfaces to any appreciable or objectionable extent.

Still another object is to provide an improved mining procedure involving the heating and utilization of a novel heating medium.

The basic procedure of the present invention of primary importance for the provision of hot saline water for sulfur mining processes involves adding to sea water or other scale-forming water a small percentage of a finely divided earthy material, such as mud, of a particle size which forms a suspension in the water and thereafter heating the resulting suspension to the temperature required for the mining of sulfur. In this heating operation the scale-forming salts of said water deposit for the most part upon the earthy particles rather than upon the hot metal surfaces with which the heated water comes in contact. The resulting hot mud suspension containing the scale-forming compounds including magnesium hydroxide, calcium carbonate, calcium sulfate, hydrous oxides of silicon, iron and other metals is then pumped into the sulfur formation in accordance with conventional procedures.

The process of the instant invention is applicable to any water containing salts having an undesirable tendency to form scale on metal surfaces when it is heated to sulfur mining temperatures. It is particularly applicable to sea water including brackish water and may utilize any saline water regardless of its source, such water being formation water or bleed water withdrawn from sulfur mines.

The process of the invention may utilize any finely divided solid material available in sufficiently large quantities at low cost. Preferred materials are alluvial deposits such as mud from the Mississippi Delta region. Clay, gypsum, or silica gel may alternatively be employed if economic considerations permit. As to the particle size of such earthy materials it is essential only that it be fine enough to stay in suspension during the period when the hot water containing the same is being flowed to the sulfur mine. Although the materials are satisfactory when substantially all particles will pass through a 200 mesh screen it is preferable that the material pass through a 325 mesh screen.

In accomplishing the objects of the invention, it is necessary only that a small percentage of mud be incorporated in the water before it is heated to a scale-forming temperature. In most operations the lowest concentration of mud is employed which will effectively prevent the deposition of scale in the sulfur mining equipment. The minimum concentration of mud permissible is almost entirely dependent upon the composition of the water, as to its particular salt content. The optimum concentration in any particular mining operation can be readily determined by trial and error in the specific equipment employed by examining the interior surfaces of the high pressure heaters, pumps and sections of the water-carrying pipes leading to the wells. Ordinarily, concentrations between 1 and 5% are found to be most satisfactory but under special circumstances other concentrations will perform properly as from 0.5 to 10%.

The mud or other earthy material can be used for preventing the scaling of equipment in accordance with the present invention by introducing it at one of several points in the mining system depending upon the type of water-heating equipment employed. When the water heating system is of conventional type used in sulfur mining, as hereinbefore described, the mud in concentrated suspension form is most easily introduced either into the low pressure heater or at a point between the low pressure and high pressure heater. In any system where packed towers are employed for the utilization of heat from flue gases, it is preferable to introduce the mud suspension at a point subsequent to the flue gas heater in order to avoid the possibility of mud settling out in relatively low velocity zones of the heating equipment. It is preferable that the mud suspension be introduced at a point at which the fluid velocities are always relatively high, for example, greater than 7 or 8 feet per second. To avoid precipitation of scale, the mud must ordinarily be introduced at some point in the system before the water has been heated above about 210° F.

A preferred embodiment of the invention involves first preparing a concentrated mud suspension by introducing raw mud, which may be obtained by hydraulic dredge or other earth moving equipment, into an agitating tank into which a quantity of saline water to be used is also introduced. The amount of mud and water introduced into the tank are such as will provide a suspension of from about 20 to 30% solids. This flowable mud suspension may then be introduced into a flowing stream of the saline water being heated at a point between the low pressure and high pressure heaters in the proportion of about one part of suspension to nineteen parts of water thereby providing a hot mud suspension of about 1% solids. This 1% suspension is heated to the mining temperature in the high pressure heater and then pumped to and down into the wells for melting the sulfur in accordance with conventional procedure.

Where highly porous and cavernous sulfur formations are encountered, the practice of the present invention is particularly advantageous. In such limestone deposits containing the sulfur, ordinary hot water introduced at the bottom of the sulfur formation rises too rapidly and forms channels which convey the hot water from the bottom of the well to the top of the formation without melting adequate sulfur. The mud suspension utilized in the process of the present invention leads to sulfur recoveries higher than those obtainable by ordinary hot water due to the fact that the suspension possesses a higher density. A suspension containing 5% of solids has a density of about 1.03 and when this suspension is employed in the mine, the hot fluid is caused to spread out from the well rather than to arise abruptly due to low specific gravity. The suspension is cooled in the sulfur bearing formation by giving up its heat to the sulfur-containing porous limestone and the solid particles gradually settle out in cavities in the rock since the velocity of the fluid decreases as it spreads out from the well. Then, the remaining water no longer has the initial high density but instead has a density approximating that of the formation water found naturally in the sulfur-bearing limestone. To assist the mining operation, the concentration of the mud in the water may be increased somewhat over the minimum amount required for preventing scale deposition, but if a too highly concentrated suspension is used for too long a time, the porosity of the sulfur-bearing formation in the vicinity of the well will be so much reduced that sufficient volumes of hot fluid can no longer be introduced and as a result the well would have to be abandoned before it has produced its normal complement of sulfur.

Although the present invention is designed to avoid the necessity for any lime-soda treatment of the water to be heated, it is realized that the mud suspension procedure of the invention may have applicability to waters which for one reason or another are to be partially softened by such chemical treatment. If such procedure is used, the water would be partially softened by a lime-soda treatment either under hot or cold conditions, then filtered and supplemented by an addition of a mud suspension before the final heating of the water in the conventional heating equipment. In this procedure, it should be observed that the mud is not filtered out with the chemically converted salts and the filters used are of a capacity to accommodate only that part of the salt content which has been precipitated out.

Example 1

In conventional heating equipment for providing hot water required for sulfur mining, a stream of filtered sea water is flowed into the top of a packed tower and in contact with boiler furnace flue gases at a temperature and in a quantity which raises the temperature of the water to about 140° F. in flowing therethrough. The partially heated water is next heated to a temperature of about 200 to 210° F. by direct contact with low pressure exhaust steam in the usual heating tank for this purpose. Thereupon a mud suspension is introduced into the hot water flowing from this second heater in a quantity which provides a mud suspension of about 1% solids, the mud used being an alluvial deposit from the Mississippi Delta region. The resulting mud suspension is thereupon flowed into and through a high pressure heater wherein the temperature of the mud-salt water mixture is raised to 330 to 360° F. by direct contact with high pressure steam. The hot mud suspension obtained is then pumped in accordance with conventional procedures down into the sulfur formation for melting and recovering sulfur.

Example 2

An aerated formation water containing some rain water collected in a reservoir adjacent a sulfur mining operation was preheated to 210° F. in a low pressure direct heater, and was next mixed with a clay the particles of which were for the most part smaller than 200 mesh, in a quantity which provided a slurry of approximately 4% solids. This slurry was then passed to a high pressure heater where it was heated to 325° F. by means of direct steam. The resulting hot mud suspension was particularly suited for the mining of sulfur in formations of porous character.

After several days' operation of the heating equipment an examination of the interior walls of the high pressure heater revealed a very thin film of soft light gray mud which on drying curled from the metal in small flakes. An examination of the deposit revealed that it was composed primarily of wet clay containing dispersed round particles of white, medium hard solids. This slight coating was protective in character and insufficient to reduce the efficiency of the heater perceptibly.

In the above process, the saline water from the reservoir was pumped to the top of a low pressure heater and flowed downwardly therethrough. By contact with rising hot flue gases, the water was first raised to an average temperature of 132° F. in the top section and then raised to 210° F. by contact with steam exhausted substantially at atmospheric pressure in the lower section of the heater. The clay was fed into the water in a tank by means of an adjustable screw feeder and was mixed thoroughly by means of suitable agitators to provide a homogeneous suspension.

Example 3

A brackish water is introduced at the rate of ten gallons per minute at a temperature of 85° F. into the top of a packed tower wherein the water is heated to a temperature of 190° F. by contact with hot combustion gases introduced into the side of the tower. The water thereupon passes downwardly through a lower packed section of the tower wherein it is heated to 210° F. by contact with low pressure exhaust steam under a three pound pressure introduced near the bottom of the tower.

The partially heated water is next flowed through a mixing tank wherein a suspension of —325 mesh alluvial mud is mixed therewith in a quantity which provides a 1% solids suspension. This suspension is thereupon introduced as a spray into a closed heater in contact with high pressure steam also introduced into the heater. The mud suspension heated to a temperature of 325° F. is then flowed from the high pressure heater and is ready for pumping into the sulfur formation.

*Example 4*

Sea water is introduced at a rate of about 9.5 gallons per minute into a directly fired flue gas heater and heated therein to a temperature of about 185–190° F. The resulting hot water is next flowed through a mixing tank wherein a suspension of alluvial mud from the Mississippi Delta region is mixed therewith in a quantity providing a 1% solids suspension. The resulting suspension is thereupon forced under superatmospheric pressure into and through an indirect heat exchanger composed of two tubular heaters in series heated by means of steam under constant pressure. The hot mud suspension flowing from the tubular heater at a temperature of 325° F. is then pumped into the sulfur formation.

The instant invention should not be confused with known practices in connection with the mining of sulfur in which water, of the purity conventionally employed in the mining of sulfur, containing mud composed at least in part of very coarse particles, is pumped cold into sulfur mines in large amounts for relatively short periods to fill up the cavities and excessively large pores in the sulfur-containing limestone formation. In contrast to such procedure the instant invention involves the heating and utilization of scale-forming waters containing very finely divided mud, the amount of mud preferably being limited such that the suspension can be employed continuously for the mining of sulfur in the place of conventional chemically treated water.

The invention provides outstanding advantages in permitting the use of scale-forming waters without the cost and trouble of chemical treatment and the expense of equipment (including large filters) necessary to accomplish the removal of the precipitated salts.

It should be understood that the present invention is not limited to the exact details herein disclosed but that it extends to all equivalent materials and procedures which will occur to those skilled in the art upon consideration of the scope of the claims appended hereto.

I claim:

1. A process for providing hot water for the mining of sulfur, from scale-forming waters which comprises adding to the scale-forming water a small percentage of a finely divided earthy material of a particle size finer than —200 mesh size, thereby forming a suspension of from 0.5 to 10% solids, and thereafter heating the resulting suspension to the temperature required for the mining of sulfur, and forcing the resulting hot water suspension containing scale-forming salts deposited on the earthy particles into the mine for the melting of sulfur therein.

2. A process for providing hot water for the mining of sulfur, from scale-forming waters which comprises adding to the scale-forming water an aqueous suspension of an alluvial mud of particle sizes substantially all finer than 200 mesh and in a quantity providing a saline water-mud suspension of from 0.5 to 10% solids content, thereafter heating the resulting suspension to the temperature required for the mining of sulfur and causing the scale-forming salts of said water to deposit on the earthy particles and forcing the hot water suspension thereby obtained into the mine for the melting of sulfur therein.

3. A process for providing hot water for the mining of sulfur, from scale-forming waters which comprises preheating the scale-forming water to a temperature of from about 210° to 240° F., adding to the preheated water a small percentage of a finely divided earthy material of a particle size finer than —200 mesh size, thereby forming a suspension of 0.5 to 10% solids, heating the resulting suspension to the temperature required for the mining of sulfur by directly contacting the same with high pressure steam under pressure and causing the scale-forming salts of said water to deposit on the earthy particles and forcing the hot water suspension thereby obtained into the mine for the melting of sulfur therein.

4. A process for providing hot water for the mining of sulfur, from scale-forming waters which comprises preheating the scale-forming water to a temperature of from about 210 to 240° F., adding to the preheated water a small percentage of a finely divided earthy material of a particle size finer than —200 mesh size, thereby forming a suspension of 0.5 to 10% solids, heating the resulting suspension under pressure to the temperature required for the mining of sulfur by flowing the same through heated tubes at a velocity of at least eight feet per second and causing the scale-forming salts of said water to deposit on the earthy particles and forcing the hot water suspension thereby obtained into the mine for the melting of sulfur therein.

5. In the mining of sulfur, the process which comprises adding to saline water having scale-forming properties when heated to high temperatures, a small percentage of a finely divided earthy material of a particle size finer than —200 mesh size, thereby forming a suspension of 0.5 to 10% solids, thereafter heating the suspension to the temperature required for the mining of sulfur and causing the scale-forming salts of said water to deposit on the earthy particles and pumping the resulting hot water and suspended particles into the sulfur formation.

6. In the mining of sulfur, the process which comprises preheating a flowing stream of sea water to a temperature of from about 210 to 240° F., adding to the preheated water before any precipitation of salts occurs an aqueous suspension of an alluvial mud finer than 200 mesh particle size in a quantity providing a sea water-mud suspension of from 0.5 to 10% solids content, thereafter heating the suspension to the temperature required for the mining of sulfur and causing the scale-forming salts of said water to deposit on the earthy particles, and pumping the resulting hot water and suspended particles into the sulfur formation.

7. In the mining of sulfur, the process which comprises preheating a flowing stream of sea water to a temperature of from about 210 to 240° F., adding to the preheated water before any precipitation of salts occurs an aqueous suspension of an alluvial mud finer than 200 mesh particle size in a quantity providing a sea water-mud suspension of from 0.5 to 10% solids content and heating the resulting suspension under pressure to the temperature required for the mining of sulfur by flowing the same through heated tubes at a velocity of at least eight feet per second, causing the scale-forming salts of said water to deposit on the earthy particles, thereby providing a hot water suspension for the melting of sulfur in the mining operation.

8. A process for providing hot water for the mining of sulfur from scale-forming saline water which comprises, continuously adding a finely divided earthy material of —200 mesh screen size to a flowing stream of saline water at a temperature below that at which scale-forming precipitates are produced, thereby forming a suspension of from 0.5 to 10% solids, continuously flowing the resulting suspension into a heater, causing the scale-forming salts of said water to deposit on the earthy particles by heating the said water to a temperature at which precipitation of the salts occurs, continuing the heating until the temperature is raised to that required in sulfur mining and continuously flowing the heated saline water containing said earthy material from said heater and down into a sulfur mine for melting the sulfur therein.

References Cited in the file of this patent

UNITED STATES PATENTS

| | | | |
|---|---|---|---|
| 443,186 | Alberger | Dec. 28, | 1890 |
| 925,283 | Brazda | June 15, | 1909 |
| 1,083,740 | Hodges | Jan. 6, | 1914 |
| 1,099,433 | Frith | June 9, | 1914 |
| 1,170,868 | Bachler | Feb. 8, | 1916 |
| 1,172,528 | Jalowetz | Feb. 22, | 1916 |
| 1,274,560 | Kobelt | Aug. 6, | 1918 |
| 1,581,545 | Prache | Apr. 20, | 1926 |
| 1,612,453 | Lundy et al. | Dec. 28, | 1926 |
| 1,648,210 | Andrews | Nov. 8, | 1927 |
| 1,673,879 | Lundy et al. | June 19, | 1928 |
| 2,137,619 | Lee | Nov. 22, | 1938 |

FOREIGN PATENTS

| | | | |
|---|---|---|---|
| 507,750 | Great Britain | June 16, | 1939 |

OTHER REFERENCES

"Water Treatment for Industrial and Other Uses," Nordell; N. Y., Reinhold, 1951, pp. 206–211.